(12) United States Patent
Conner

(10) Patent No.: US 10,160,160 B1
(45) Date of Patent: Dec. 25, 2018

(54) MINIMALLY INVASIVE SURFACE ATTACHMENT APPARATUS

(71) Applicant: Robert Conner, Panama City, FL (US)

(72) Inventor: Robert Conner, Panama City, FL (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 345 days.

(21) Appl. No.: 15/250,461

(22) Filed: Aug. 29, 2016

(51) Int. Cl.
*B32B 37/00* (2006.01)
*B29C 65/24* (2006.01)
*B32B 37/10* (2006.01)
*B32B 37/12* (2006.01)

(52) U.S. Cl.
CPC ........ *B29C 65/247* (2013.01); *B32B 37/0046* (2013.01); *B32B 37/1018* (2013.01); *B32B 37/1207* (2013.01)

(58) Field of Classification Search
CPC ........ A47J 36/28; B29C 65/247; B29C 65/26; B29C 65/7844; B29C 65/7847; B29C 65/483; B29C 66/81; B29C 66/861; B29C 66/00145; B65D 81/3484; B63C 11/52; B63B 9/00; F24V 30/00; F24V 2221/10; B32B 37/0046; B32B 37/06; B32B 37/1018; B32B 37/1207

USPC ............ 156/381, 382, 499, 579; 126/263.09
See application file for complete search history.

(56) References Cited

U.S. PATENT DOCUMENTS

| | | | | |
|---|---|---|---|---|
| 3,827,359 A | * | 8/1974 | Daughenbaugh | C09J 5/06 102/406 |
| 3,906,926 A | * | 9/1975 | Staples | C06B 33/00 126/263.05 |
| 8,905,103 B1 | * | 12/2014 | Conner | B63C 11/52 156/285 |
| 2005/0160743 A1 | * | 7/2005 | Dunwoody | A47J 36/28 62/4 |
| 2014/0251303 A1 | * | 9/2014 | Searle | A47J 36/28 126/263.09 |

* cited by examiner

*Primary Examiner* — John L Goff, II
(74) *Attorney, Agent, or Firm* — James T. Shepherd (57) ABSTRACT

A minimally invasive surface attachment apparatus for non-penetrating mechanical attachment of components to a target surface includes a cartridge assembly and mounting assembly. Actuation of the cartridge assembly causes first and second exothermic reactants located between outer casing and the inner casing to come into contact and cause an exothermic reaction. This reaction liquefies a bonding material between the cartridge assembly and mounting assembly, allowing it to flow around the mounting assembly and onto a target surface creating a seal. Vacuum pressure will bind the mounting assembly to a target surface.

21 Claims, 8 Drawing Sheets

MINIMALLY INVASIVE SURFACE ATTACHMENT APPARATUS

STATEMENT OF GOVERNMENT INTEREST

The invention described herein may be manufactured and used by or for the Government of the United States of America for Governmental purposes without the payment of any royalties.

FIELD OF INVENTION

This invention relates to the field of surface bonding and more specifically to a bonding means using an evacuated chamber.

BACKGROUND OF THE INVENTION

Sensors, recording devices, and other components must often be secured to watercraft and maritime equipment without compromising waterproofing or pressurization structures. Mechanical methods of affixation which penetrate the target surface can compromise the water resistance and/or controlled pressurization of a water craft.

Current non-penetrating methods of affixation known in the art make them impractical for use on ships and maritime environmental surfaces, particularly for in situ modifications in a marine environment. Adhesives presently known in the art require cleaned surfaces, and take time to cure or may be chemically unstable or hazardous. Magnetic devices are unsuitable for attachment to polymer, fiberglass, wooden, and non-ferrous surfaces. Suction devices may be destabilized or compromised by imperceptible impurities or deposits on the target surface to which they are attached.

U.S. Pat. No. 8,905,103 teaches an effective non-penetrating fastening system for multiple types of surfaces in a marine environment without a complex system for attachment. However, this apparatus requires a power source and electronic controller, which presents limitations for maritime environments.

There is an unmet need in the art for a minimally invasive, highly stable method of affixation for maritime vehicle surface components. There is a further unmet need in the art for an apparatus capable of attaching a fastener to a target surface in a marine environment without creating hazards for workers or damaging the target surface.

BRIEF SUMMARY OF THE INVENTION

The invention is a novel minimally invasive surface attachment apparatus for affixing objects to the surface of equipment in maritime environments. The invention includes a novel cartridge assembly with an outer casing containing a first exothermic reactant material and an inner casing containing a second exothermic reactant. Rotation of the inner casing relative to the outer casing brings the reactants into contact, causing an exothermic reaction at a temperature which heats a quantity of bonding material with a low melting point. This causes the bonding material to expand and flow over and around a mounting assembly and within a perimeter defined by a sealing skirt component. Various embodiments may include additional components such as a vacuum pump and handle. The bonding material cools and solidifies creating an air and water tight seal. Pulling a vacuum using the vacuum pump will bind the mounting assembly to the target surface.

TERMS OF ART

As used herein, the term "bonding material" refers to any material or combination thereof capable of melting and bonding when cooled. Bonding materials may include, but are not limited to thermoplastic polymers, waxes, metals, alloys, resins, and combinations of the foregoing.

As used herein, the term "exothermic reactant" refers to a material capable of producing an exothermic reaction when combined with another exothermic reactant. For example, water may be one exothermic reactant that, when combined with anhydrous salts, with metal oxides (such as calcium oxide), or with a combination of metals and salts, will produce an exothermic reaction.

As used herein, the term "frictional surface" refers to an element interposed between two surfaces to increase friction.

As used herein, the term "low melting point" refers to a melting point between approximately 50 degrees F. and approximately 150 degrees F.

As used herein, the term "minimally invasive" refers to an apparatus, method, or component that minimally deforms or alters a surface to which an object is being attached.

As used herein, the term "mounting assembly" refers to a disc or plate which may be attached to a target surface for the use in securing objects.

As used herein, the term "perimeter edge" refers to an edge extending around the circumference of an element.

As used herein, the term "pressure relief valve" refers to a valve which is closed below a target pressure and open above the target pressure to allow relief of pressure from a chamber.

As used herein, the term "proximate" refers to a location which is closer to a reference point.

As used herein, the term "rotatably connected" refers to two or more connected structural elements wherein at least one structural element rotates relative to the position of another.

As used herein, the term "slidably connected" refers to two or more structural elements wherein at least one structural elements moves longitudinally at least partially within another.

As used herein, the term "self-tapping" refers to an element capable of cutting into a surface as the element rotates.

DETAILED DESCRIPTION OF THE INVENTION

Figure 1:
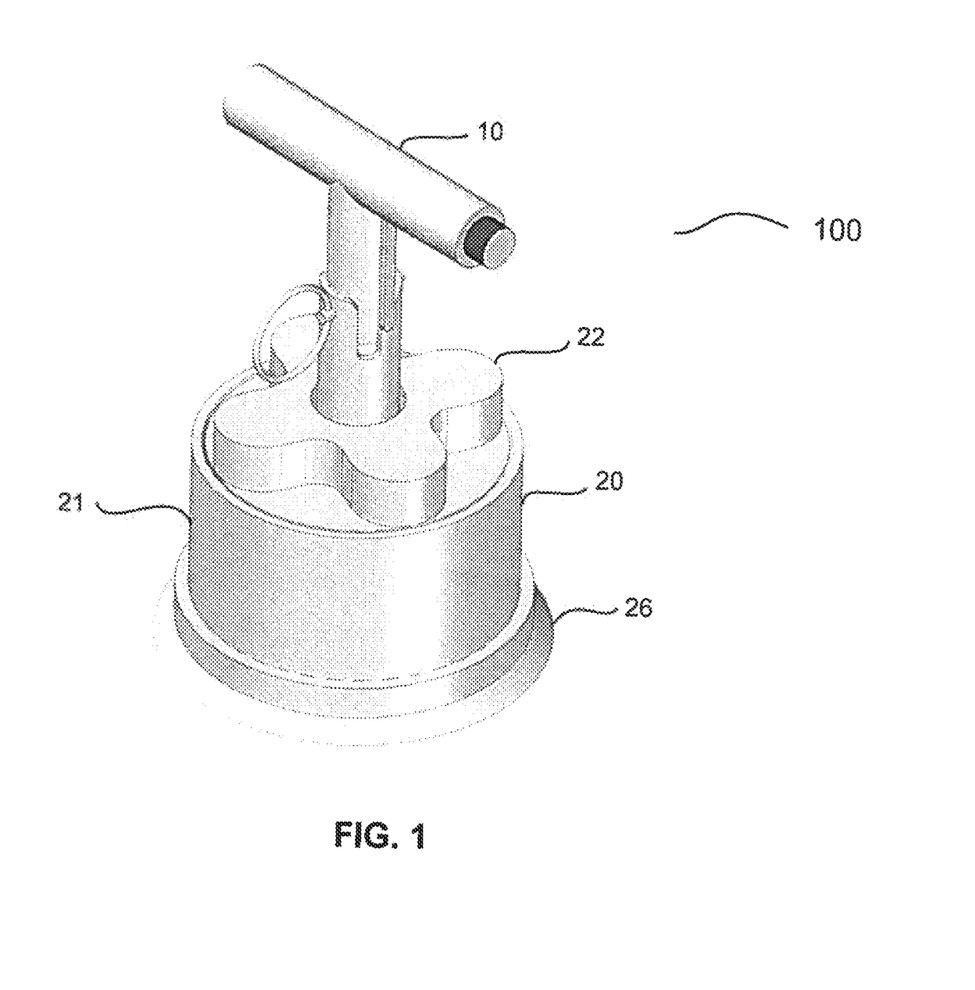
FIG. 1 illustrates an isometric view of an exemplary embodiment of a surface attachment apparatus.
Figure 1A:
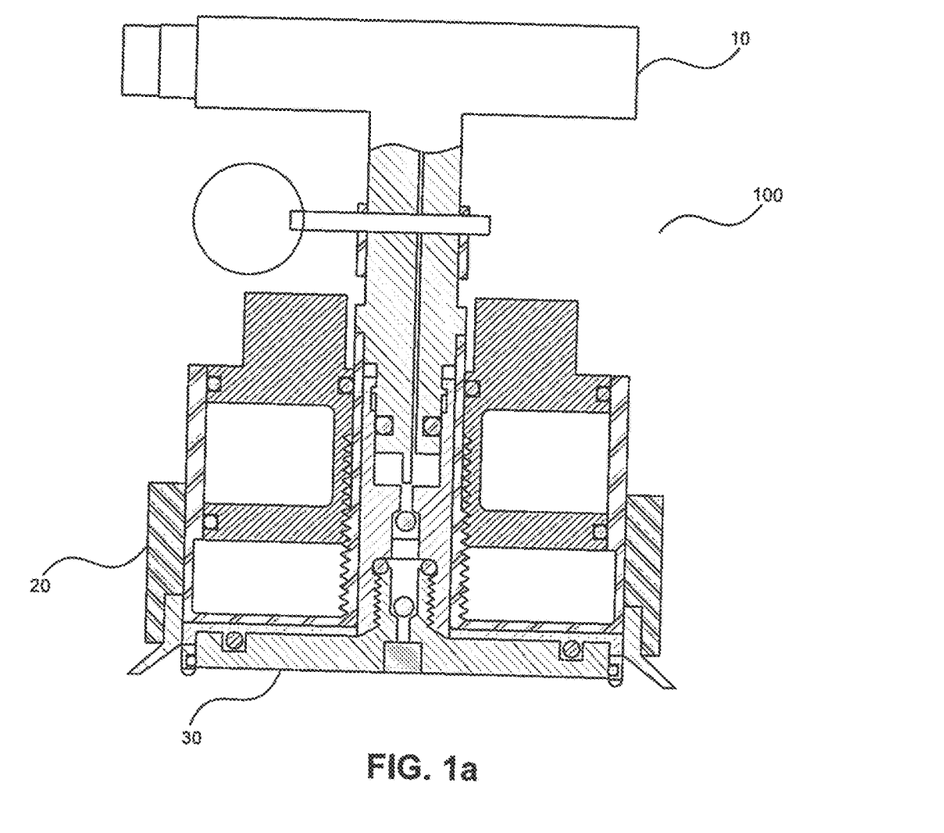
FIG. 1a illustrates a cross-sectional view of an exemplary embodiment of a surface attachment apparatus.
Figure 1B:
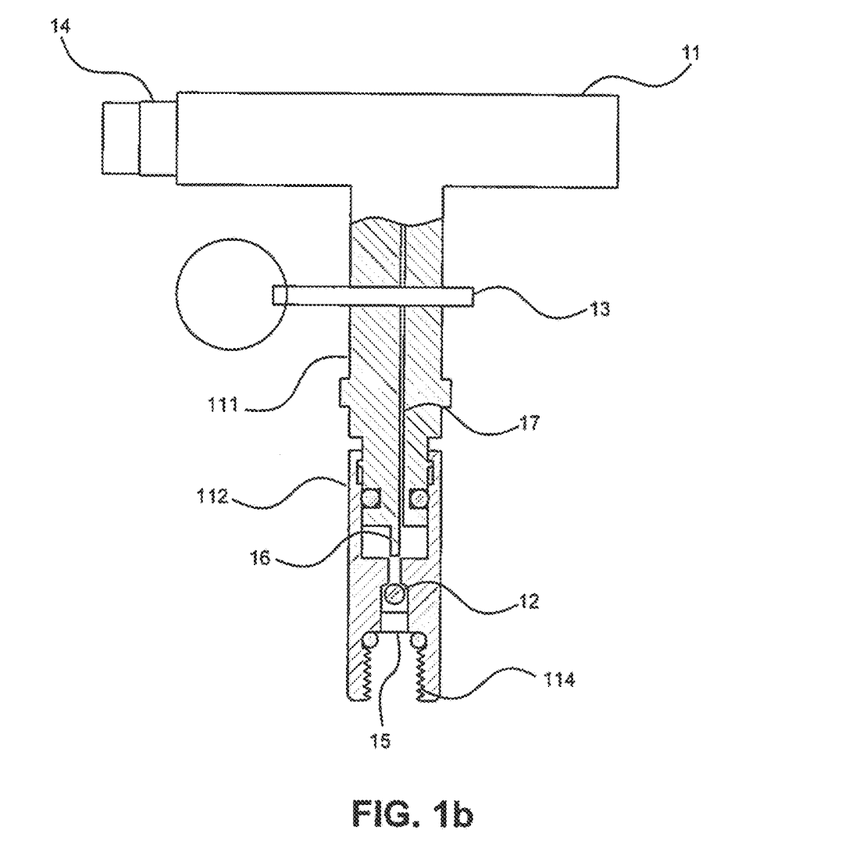
FIGS. 1b through 1d illustrate cross-sectional views of an exemplary embodiment of a handle assembly, a cartridge assembly, and a mounting assembly, respectively.
Figure 1C:
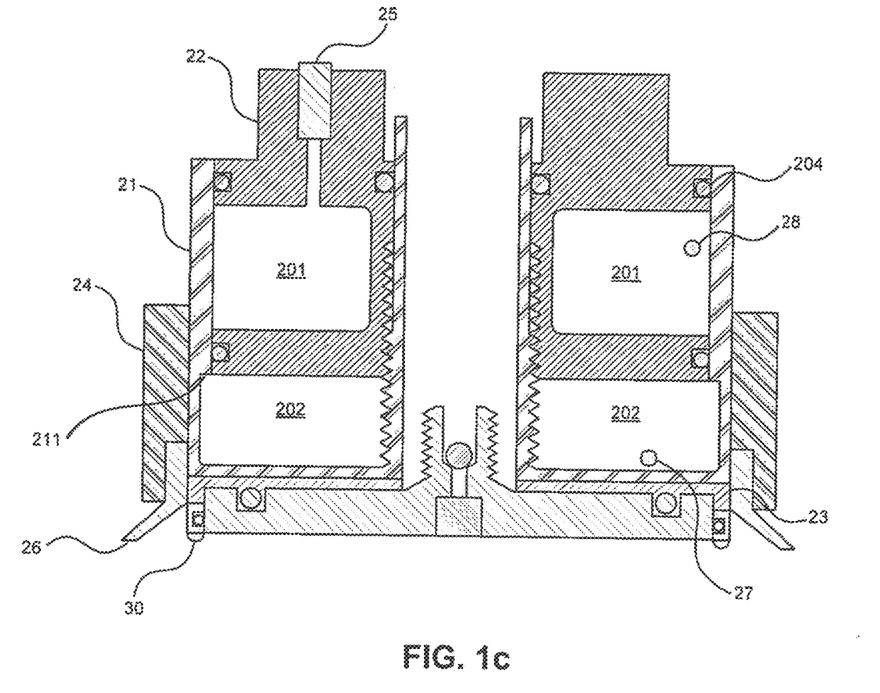
Figure 1D:
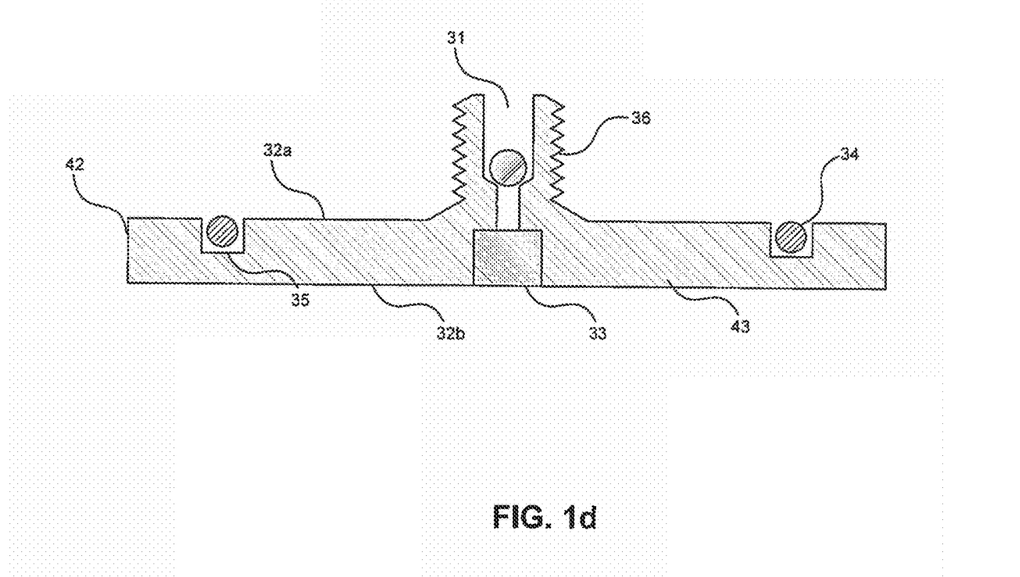

FIG. 1 illustrates an isometric view of an exemplary embodiment of surface attachment apparatus 100 showing vacuum pump assembly 10, and cartridge assembly 20 including visible portions of its outer casing 21, inner casing 22, and sealing skirt 26. FIG. 1a illustrates a cross-sectional view of an exemplary embodiment of surface attachment apparatus 100. FIGS. 1b through 1d illustrate cross-sectional views of an exemplary embodiment of vacuum pump assembly 10, cartridge assembly 20, and mounting assembly 30, respectively.

In the exemplary embodiment shown (e.g., in FIG. 1a), mounting assembly 30 is removably connected to cartridge assembly 20 and vacuum pump assembly 10. In use, a user will insert vacuum pump assembly 10 through cartridge assembly 20 and attach it to mounting assembly 30, holding mounting assembly 30 to cartridge assembly 20 in the process. The user will then preferably prime a vacuum within vacuum pump assembly 10 and actuate cartridge assembly 20 before pressing mounting assembly 30 against a target surface (not shown in the figures) and bonding it thereto. Actuation of cartridge assembly 20 will cause an exothermic reaction that will melt a bonding material 23, which will flow from apparatus 100 to the area immediately surrounding mounting assembly 30 at the target surface. The user will actuate vacuum pump assembly 10 to further draw a vacuum from the area and increase the hold of apparatus 100 onto the surface. Once the bond is complete, a user will remove vacuum pump assembly 10 and cartridge assembly 20 from the mounting assembly 30, leaving mounting assembly 30 attached to the surface. The user may then remove cartridge assembly 20 from vacuum pump assembly 10, connect another cartridge assembly 20 and mounting assembly 30, and repeat the process.

In the exemplary embodiment shown (e.g., in FIG. 1b), vacuum pump assembly 10 includes a handle 11, a first check valve 12, a movable securing component 13, a vacuum pump 14, a handle filter 15, a check valve actuator 16, and a lumen 17. In the exemplary embodiment, handle 11 has a T-shaped configuration with an upper leg portion 111 and two arms, which provides a grip for a user to manipulate vacuum pump assembly 10. Handle 11 also has a lower leg portion 112 slidably connected to upper leg portion 111 wherein a distal end of upper leg portion 111 is inserted into a cavity in a proximal end of lower leg portion 112. The distal end of upper leg portion 111 includes a check valve actuator 16. The exemplary handle 11 also has interior threads 114 at the distal end of lower leg portion 112 for attaching handle 11 to mounting assembly 13.

For convenience, vacuum pump 14 is located within handle 11, extending from one arm of handle 11 to allow single-handed use of vacuum pump assembly 10. Vacuum pump 14 draws a vacuum to draw the surface attachment apparatus 100 against a target surface. Vacuum pump 14 is a manual pump actuated by a user. A first check valve 12 is located adjacent to the distal end of the leg of handle 11. Check valve actuator 16 opens first check valve 12 when upper leg portion 111 is slid deeper into lower leg portion 112, allowing vacuum pump 14 to draw a vacuum within the space between attachment apparatus 100 and the target surface. Handle filter 15, located at a distal end of the leg of handle 11, prevents debris from fouling and potentially damaging first check valve 12. Movable securing component 13 extends through handle 11 and cartridge assembly 20 to prevent cartridge assembly 20 from rotating when heating cartridge assembly 20 and to prevent inadvertent actuation of first check valve 12. In the exemplary embodiment, movable securing component 13 is a quick release pin. In other embodiments, movable securing component 13 may be a detent, a mechanically rupturing component, or interlocking geometric components. Lumen 17 is enclosed by handle 11 and operatively coupled to first check valve 12 to allow withdrawal of air and/or liquid from mounting assembly 30 and the area surrounding it.

As shown in FIG. 1c, cartridge assembly 20 includes an outer casing 21, an inner casing 22, a bonding material 23, insulation 24, a pressure relief valve 25, and a sealing skirt 26. Outer casing 21 is cylindrical, connecting to inner casing 22 by means of a threaded connection allowing inner casing 22, which is also cylindrical, to rotate relative to outer casing 21 to raise or lower inner casing 22 within outer casing 21. Handle 11 extends through a central aperture in inner casing 22 to removably connect to mounting assembly 30. Cartridge assembly 20 has a dual-chamber structure with a toroidal upper chamber 201 defined within inner casing 22 and a toroidal lower chamber 202 defined within outer casing 21. It can also have O-rings 204 to isolate the chambers from each other as well as from the outside environment. A first exothermic reactant 27 comprising a solid or a liquid reactant is located in lower chamber 202. A second exothermic reactant 28 comprising a liquid reactant is located in upper chamber 201. Exothermic reactants 27 and 28 can comprise any combination of reactants known in the art that will produce sufficient heat when combined to melt bonding material 23 as discussed below. In the exemplary embodiment, upper chamber 201 has a smaller diameter than lower chamber 202. Outer casing 21 includes a shoulder 211 in its interior wall so that upper chamber 201 is placed in communication with lower chamber 202 when inner casing 22 is rotated to lower it within outer casing 21, allowing the first and second exothermic reactants 27 and 28 to mix and produce heat through an exothermic reaction.

Bonding material 23 is a material with a low melting point capable of melting and flowing when heated, but cooling to a solid. Before use, bonding material 23 forms an interface between outer casing 21 and mounting assembly 30. When apparatus 100 is deployed against a target surface and the exothermic reaction is initiated, bonding material 23 is heated and melts; it then flows through a gap (not shown) between sealing skirt 26 and mounting assembly 30 to form a seal between the attachment disc 43 of mounting assembly 30 and the target surface.

Insulation 24 surrounding outer casing 21 prevents heat produced by the reaction from injuring a user and reduces heat losses so fewer exothermic reactants are needed. In the exemplary embodiment, sealing skirt 26 is located between insulation 24 and outer casing 21. Sealing skirt 26 is a ring of an elastomeric polymer having a melting point above the temperature produced by the exothermic reaction. In the exemplary embodiment, sealing skirt 26 is made from rubber. Sealing skirt 26 contacts the target surface to contain liquid bonding material 23 around the perimeter of attachment disc 43 until bonding material 23 solidifies. While sealing skirt 26 prevents bonding material 23 from escaping from the area immediately surrounding attachment disc 43, sealing skirt 26 preferably has small slots (not shown) in its perimeter to allow fluid or air to escape when bonding material 23 flows into the area to displace the fluid or air. Pressure relief valve 25 limits the pressure rise in outer casing 22 and inner casing 21 produced by the exothermic reaction.

As shown in FIG. 1d, mounting assembly 30 includes an attachment disc 43 with a perimeter edge 42, a second check valve 31, upper and lower mounting surfaces 32a and 32b, a disc filter 33, a D-ring 34 disposed within a D-ring groove 35, and central column 36. Central column 36 extends vertically from a center of upper disk surface 32a. In the exemplary embodiment, central column 36 is threaded to engage the interior threads 114 on handle 11 and to place lumen 17 into fluid communication with mounting assembly 30 and the area under it via check valves 12 and 31 and filters 15 and 33. In addition to allowing connection of the mounting assembly 30 to vacuum pump assembly 10, the threads on central column 36 can also be used to connect another device or fastener after mounting assembly 30 is attached to a surface and the vacuum pump assembly 10 and cartridge assembly 20 are removed. Second check valve 31, located within central column 36 adjacent to a distal end of the leg of handle 11, prevents loss of vacuum from mounting assembly 30. Second check valve 31 is oriented to prevent flow in the opposite direction of first check valve 12. As a result, when check valve actuator 16 opens first check valve 12, the vacuum drawn by vacuum pump 14 opens second check valve 31 and evacuates any air or liquid located between the target surface and attachment disc 43. Disc filter 33, located adjacent to second check valve 31 within central column 35, prevents debris from fouling and potentially damaging second check valve 31. D-ring 34 is recessed into a D-ring groove 35 in upper mounting surface 32a, and provides another attachment point on mounting assembly 30 (e.g., in addition to the threaded central column 36) after it is mounted on the target surface in accordance with this invention.

Figure 1E:
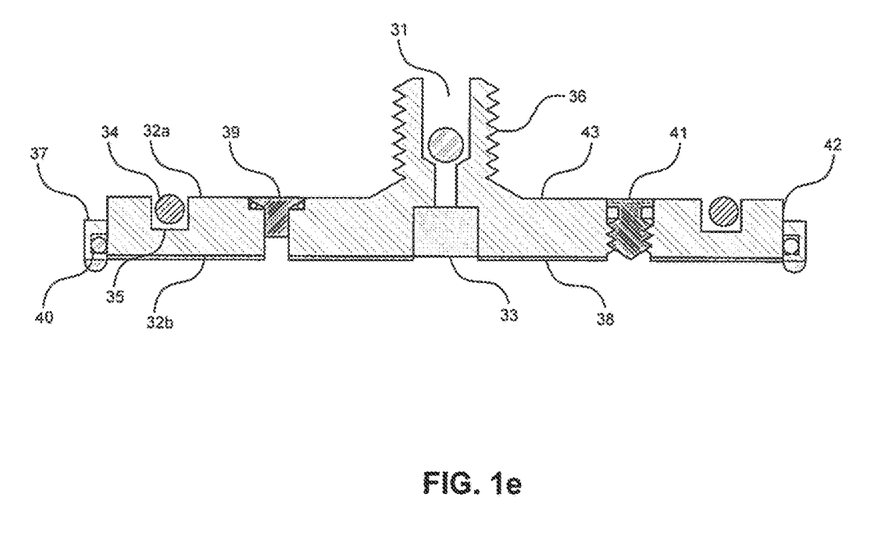
FIG. 1e illustrates a cross-sectional view of an alternate embodiment of a mounting assembly.

FIG. 1e illustrates a cross-sectional view of an alternate embodiment of mounting assembly 30. In this embodiment, inner seal 37 provides an additional seal on smooth surfaces to replace or augment the sealing interface created by bonding material 23. Inner seal 37 is located between perimeter edge 42 of attachment disc 43 and an inner periphery of sealing skirt 26. Inner seal 37 can rotate about attachment disc 43. A sealing O-ring 40 provides an air and water tight interface between inner seal 37 and attachment disc 43.

In certain embodiments, a frictional surface 38 may be disposed on lower mounting surface 32b, increasing friction between mounting assembly 30 and the surface. Frictional surface 38 may be a mesh or a sheet of sandpaper or other similar material. In embodiments using inner seal 37, inner seal 37 also prevents bonding material 23 from interfering with the frictional contact between the target surface and frictional surface 38.

In certain embodiments, sealing fastener 39, which extends partially through attachment disc 43, allows equalization of pressure and removal of mounting assembly 30 when it is unscrewed. In certain embodiments, a threaded self-tapping fastener 41 extends through attachment disc 43. Rotating self-tapping fastener 41 causes self-tapping fastener 41 to cut into the target surface, increasing friction between mounting assembly 30 and the target surface even if self-tapping fastener 41 does not significantly penetrate the target surface.

Figure 2A:
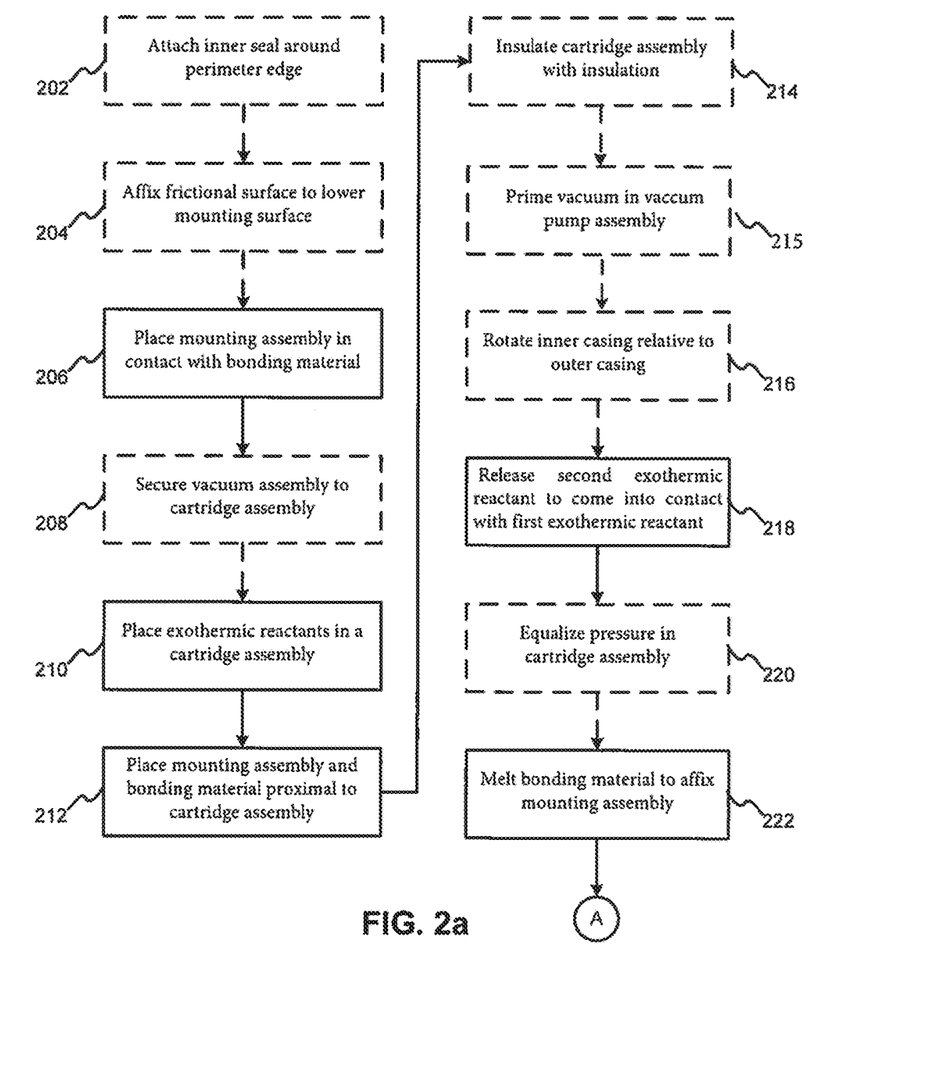
FIGS. 2a and 2b illustrate a flowchart of a method for affixing surface components to maritime equipment.
Figure 2B:
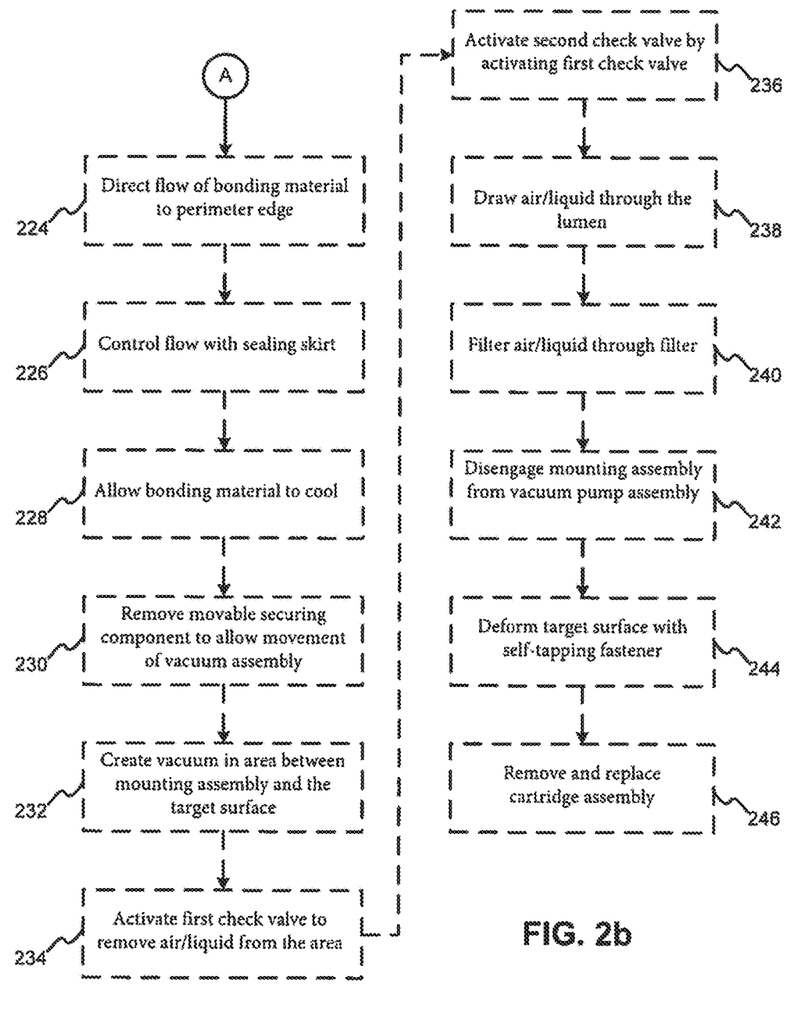

FIGS. 2a and 2b illustrate a flowchart of method 200 for affixing surface components to maritime equipment.

In optional step 202, method 200 attaches inner seal 37 around perimeter edge 42.

In optional step 204, method 200 increases friction between mounting assembly 30 and a target surface by affixing frictional surface 38 to lower mounting surface 32b.

In step 206, method 200 places mounting assembly 30 in contact with a quantity of bonding material 23.

In optional step 208, method 200 secures vacuum assembly 10 to cartridge assembly 20 with movable securing component 13 to prevent movement of vacuum assembly 10.

In step 210, method 200 places first exothermic reactant 27 into chamber 202 of cartridge assembly 20 and second exothermic reactant 28 into chamber 201. The chambers of cartridge assembly 20 are mechanically separated at this point.

In step 212, method 200 places mounting assembly 30 and bonding material 23 proximal to cartridge assembly 20.

In optional step 214, method 200 insulates cartridge assembly 20 with insulation 24.

In optional step 215, method 200 primes the vacuum by creating a vacuum within vacuum assembly 10.

In optional step 216, method 200 rotates inner casing 22 relative to outer casing 21 to place chambers 201 and 202 into communication with each other.

In step 218, method 200 mechanically releases second exothermic reactant 28 to come into contact with first exothermic reactant 27 to cause an exothermic reaction.

In optional step 220, method 200 equalizes pressure in cartridge assembly 20 by actuating pressure relief valve 25.

In step 222, method 200 melts bonding material 23 by the exothermic reaction to affix mounting assembly 30 to the target surface.

In optional step 224, method 200 directs the flow of bonding material 23 to perimeter edge 42 of surface mounting assembly 30.

In optional step 226, method 200 controls the flow with sealing skirt 26.

In optional step 228, method 200 allows bonding material 23 to cool.

In optional step 230, method 200 removes movable securing component 13 to allow the movement/operation of vacuum assembly 10.

In optional step 232, method 200 creates a vacuum in an area between mounting assembly 30 and the target surface by using vacuum pump assembly 10.

In optional step 234, method 200 activates first check valve 12 to remove fluid or air from the area.

In optional step 236, method 200 activates second check valve 31 by activating first check valve 12.

In optional step 238, method 200 draws the fluid or air through lumen 17.

In optional step 240, method 200 filters the fluid or air through handle filter 15 or disc filter 33.

In optional step 242, method 200 disengages mounting assembly 30 from vacuum pump assembly 10.

In optional step 244, method 200 increases friction between mounting assembly 30 and the target surface by deforming the target surface with self-tapping fastener 41.

In optional step 246, method 200 removes cartridge assembly 20 and replaces it with a new cartridge assembly 20.

Surface attachment apparatus 100 offers several advantages to conventional attachment methods, especially if a user wants to temporarily attach an item above or under water. Using apparatus 100 is less time and labor intensive than attaching items with penetrating fasteners and does not require topside support for underwater attachments. It is not limited to ferrous materials, will work on dirty or corroded surfaces, and can be used over a broader temperature range than adhesives. Apparatus 100 is also safer because it does not discharge dangerous projectiles like stud guns. It utilizes a fairly benign chemical reaction which is chemically more stable than that of propellant in a stud gun. Apparatus 100 does not require power sources such as batteries, which may be hazardous in a marine environment. Cartridge assembly 20 can be easily replaced and reused multiple times.

It will be understood that many additional changes in the details, materials, procedures and arrangement of parts, which have been herein described and illustrated to explain the nature of the invention, may be made by those skilled in the art within the principle and scope of the invention as expressed in the appended claims. Moreover, the terms "substantially" or "approximately" as used herein may be applied to modify any quantitative representation that could permissibly vary without resulting in a change in the basic function to which it is related.

It should also be understood that, while the invention is primarily directed towards the attachment of equipment to underwater surfaces or maritime equipment, the invention and methods described herein may also be utilized in a dry, above-water, environment. In either situation, the vacuum pump will create a vacuum in the area under and around the mounting assembly by drawing air or water, as the situation may dictate, from the area through the lumen via the central column, filters, and check valves.

It should be further understood that the drawings are not necessarily to scale; instead, emphasis has been placed upon illustrating the principles of the invention.

What is claimed is:

1. A minimally invasive surface attachment apparatus comprising:
   a self-heating cartridge assembly which is comprised of:
      an outer casing containing a first exothermic reactant,
      an inner casing containing a second exothermic reactant,
      wherein rotational movement of said inner casing relative to said outer casing causes said second exothermic reactant to come into contact with said first exothermic reactant and initiate an exothermic reaction,
      a sealing skirt in contact with said outer casing;
   a mounting disc assembly which is comprised of:
      an attachment disc having an upper mounting surface, a lower mounting surface, a perimeter edge surrounded by said sealing skirt, and a hollow central column,
      wherein said central column extends vertically from a center of said upper mounting surface and is proximate to said self-heating cartridge assembly;
   a quantity of bonding material in contact with said upper mounting surface and said self-heating cartridge assembly; and
   a vacuum pump assembly in contact with said central column of said mounting disc assembly.

2. The apparatus of claim 1 which further includes a sealing interface comprised of solidified bonding material formed when said bonding material melts and cools to conform to an area defined by said sealing skirt and said perimeter edge.

3. The apparatus of claim 1 wherein said vacuum pump assembly includes a lumen through which air and fluid can be withdrawn.

4. The apparatus of claim 3 wherein said vacuum pump assembly includes a first check valve operatively coupled with said lumen.

5. The apparatus of claim 4 wherein said vacuum pump assembly includes a handle which encloses said lumen and said check valve.

6. The apparatus of claim 5, wherein said handle extends through said inner casing.

7. The apparatus of claim 6, further comprising a movable securing component preventing movement of said handle relative to said outer casing to control actuation of said first check valve.

8. The apparatus of claim 7, wherein said movable securing component is selected from a group consisting of a pin, a detent, a mechanically rupturing component, and interlocking geometric components.

9. The apparatus of claim 5, wherein said handle includes a handle filter to prevent debris from fouling said first check valve.

10. The apparatus of claim 1, wherein said first exothermic reactant is material selected from a group consisting of: anhydrous salts, metal oxides, and a combination of metals and salts.

11. The apparatus of claim 10, wherein said second exothermic reactant is water.

12. The apparatus of claim 1, wherein said cartridge assembly further includes a pressure relief valve extending through said inner casing.

13. The apparatus of claim 1, wherein said cartridge assembly further includes insulation at least partially surrounding said outer casing.

14. The apparatus of claim 1, wherein said sealing skirt is a ring of an elastomeric polymer.

15. The apparatus of claim 1, wherein said bonding material is selected from the group consisting of: wax, thermoplastic polymer, resins, alloys, and any combination thereof.

16. The apparatus of claim 1, wherein said central column encloses a second check valve in operative contact with said vacuum pump assembly.

17. The apparatus of claim 16, wherein said central column further includes a disc filter located within said central column.

18. The apparatus of claim 1, wherein said mounting disc assembly further includes a D-ring located in a disc groove in the upper mounting surface of said attachment disc.

19. The apparatus of claim 1, wherein said mounting disc assembly further includes a sealing fastener extending through said attachment disc.

20. The apparatus of claim 1, wherein said mounting disc assembly further comprises a self-tapping fastener extending through said attachment disc.

21. A minimally invasive surface attachment apparatus comprising:
   a cartridge assembly comprising
      a cylindrical outer casing having an outer wall with a shoulder defined on an interior surface thereof,
      a cylindrical inner casing disposed within said outer casing and threadably engaged thereto, wherein said inner and outer casings define toroidal upper and lower chambers,
      a first exothermic reactant disposed within said upper chamber,
      a second exothermic reactant disposed within said lower chamber, and
      a sealing skirt disposed around an outer periphery of said outer casing,
      wherein rotational movement of said inner casing relative to said outer casing places said upper chamber into fluid communication with said lower chamber, thereby causing said second exothermic reactant to come into contact with said first exothermic reactant and initiate an exothermic reaction;
   a mounting disc assembly comprising an attachment disc having an upper mounting surface, a lower mounting surface, a perimeter edge, and a hollow central column having external threads disposed thereon, said hollow central column being in fluid communication with said lower mounting surface, wherein said central column extends vertically from a center of said upper mounting surface into the interior of said cartridge assembly, and wherein said perimeter edge is surrounded by said sealing skirt;

bonding material having a low melting point disposed between said upper mounting surface and said cartridge assembly, said bonding material selected from the group consisting of wax, thermoplastic polymer, resins, alloys, and any combination thereof, said bonding material being in fluid communication with said perimeter edge and said sealing skirt; and a vacuum pump assembly comprising a handle having a lower leg portion and an upper leg portion slidably connected to said lower leg portion, wherein a distal end of said lower leg portion has interior threads engaging said external threads of said central column, and wherein said lower leg portion extends through the center of said cartridge assembly and attaches to said hollow central column, a vacuum pump disposed within said handle, and a movable securing component extending through said upper leg portion and said outer casing, wherein said handle includes a lumen extending therethrough and placed in fluid communication with said vacuum pump and with said hollow central column when said handle is attached to said central column.

\* \* \* \* \*